United States Patent

[11] 3,547,404

| [72] | Inventors | George T Blackburn<br>East Greenwich;<br>Helmut J. Draxler, Warwick, R.I. |
|---|---|---|
| [21] | Appl. No. | 755,899 |
| [22] | Filed | Aug. 28, 1968 |
| [45] | Patented | Dec. 15, 1970 |
| [73] | Assignee | "Automatic" Sprinkler Corporation of America<br>a corporation of Ohio |

[54] VALVE OPERATOR WITH MANUAL OVERRIDE
7 Claims, 5 Drawing Figs.

[52] U.S. Cl. .................................................. 251/231,
251/291, 137/315
[51] Int. Cl. ..................................................... F16k 31/44
[50] Field of Search............................................ 251/214,
231, 236, 242, 243, 257, 281, 282, 291, 330;
137/315

[56] References Cited
UNITED STATES PATENTS

| 1,172,474 | 2/1916 | Madigan........................ | 251/330X |
| 2,884,004 | 4/1959 | Dierdorf........................ | 251/214X |
| 3,297,054 | 1/1967 | Nielsen et al. ................. | 251/214X |

*Primary Examiner*—William F. O'Dea
*Assistant Examiner*—David R. Matthews
*Attorney*—Barlow & Barlow ABSTRACT: A valve having a valve disc operator in the form of a crank arm which is connected by a shaft to the outer portion of the valve casing, which shaft has a seal that may be readily replaced by providing a back seat for the shaft in the casing. The actuator, which is coupled to the shaft, is provided with a manual override.

PATENTED DEC 15 1970

3,547,404

INVENTORS
GEORGE T. BLACKBURN
HELMUT J. DRAXLER
BY
Barlow & Barlow
ATTORNEYS 3,547,404

VALVE OPERATOR WITH MANUAL OVERRIDE

BACKGROUND OF THE INVENTION

In valve construction it is necessary to provide some means of leading the actuator for the valve disc through the valve casing. In all cases this means that some sealing must be provided for the passage of the actuator means which can be in the form of a shaft that may rotate or reciprocate. After the valve has been in use a period of time, it often becomes necessary to repair the sealing means that are used to prevent leakage from the valve body to the outside around the actuator shaft. In the past it has been impossible to repair valve actuator shaft seals without virtually draining the system or otherwise isolating the valve as otherwise considerable leakage will occur. The instant invention obviates this difficulty by providing a novel construction of an operator shaft wherein a portion of the shaft has a secondary seal means as well as a primary seal means, and when the shaft is disassembled, the primary seal means may be easily withdrawn leaving the secondary seal means in place. The purpose of the secondary seal is to prevent leakage or restrict leakage from the system to a very low level during the time the primary seal is not in place. Thus, it is not necessary to drain any water from the system, relieve the pressure, or shut off the water supply to the system. This facilitates the replacement of the primary seal.

SUMMARY OF THE INVENTION

A unique crank shaft assembly for a valve is provided by designing the actuator shaft in two sections that are keyed together with means to maintain the sections in keyed relation. The primary shaft O-ring seals are in the outermost section of the shaft which can be removed without any extensive disassembly of the valve. The inner section of the shaft is provided with a spring actuated back seat which limits leakage during replacement of the primary seals. A crank arm is attached to the shaft for actuation of the valve disc and mounted to a portion of the crank arm is a manual lever that biases the crank arm in a valve open direction by applying a pressure against the valve casing or other fixed abutment so that the valve may be opened manually should there be a power failure or for any other reason.

DESCRIPTION OF THE PREFERRED EMBODIMENT

Figure 1:
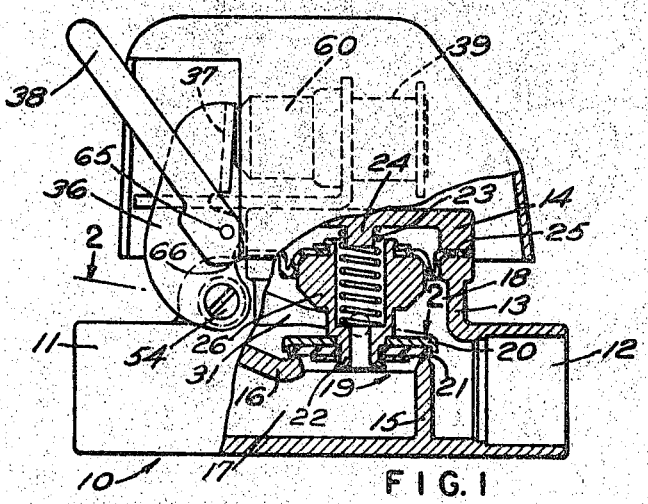
FIG. 1 is a elevational view partly in section showing the valve of our invention.

With reference to the drawings the valve body has a casing 10 with an inlet at one end 11 and an outlet at the other end 12. This casing has an upwardly extending generally cylindrical portion 13 which is provided with a removable cover 14 allowing access to the inner portion of the casing. Suitable partitions 15 and 16 divide the casing into an upstream chamber 17 and a downstream chamber 18 with a flow passage at 19 which is opened and closed by the valve disc 20 engaging a suitable seat.

This disc 20 has a sealing portion 21 of resilient material to engage the seat and a stem 22 secured thereto by any suitable means and extending upwardly therefrom into the downstream chamber 18. A spring 23 located in a bore of this stem acts on the bottom of the bore and against the cover 14 to force the valve disc downwardly into seating position. A centering boss 24 on the cover enters the helically-coiled spring. A diaphragm 25 is secured to the upper end of the stem and also extends beneath the cover to provide a gasket seal between the cover and casing and has sufficient flexible area to permit the stem to be raised or lowered in the operation of the disc. The stem has a passageway therethrough so that the area above the diaphragm 25 is subjected to the same pressure that is seen by the lower seating face of valve disc 20 and this affords disc balancing. The stem is enlarged as at 26 to support the diaphragm 25. The head is also utllilized for the lifting of the valve by a lever or crank arm which will now be described.

The actuator for the disc is effectively a crank arm and comprises an inner and outer means, the inner means 30 consisting of an arm 31 with forklike portions 32 having rounded ends 33 which extend beneath the head 26 of the disc stem for lifting the disc in reciprocating fashion. The outer means 35 of the actuator comprises an arm 36 which has a flange 37 in the path of movement of a power source such as the piston from a heat motor 39 and an auxiliary handle 38 pivoted to the arm 36. Thus, this outer means 35 or means outside of the casing is adapted to receive some movement for reciprocating. the disc.

The inner and outer means just described are connected together by a shaft so that motion may be transmitted from the arm 36 to the arm 31 through this shaft to operate the disc. This connecting shaft has two parts. There is the inner part 41 which has a collar 42 with a bore 43 for rotatably mounting shaft part 41 within the casing on a stud 44 as a bearing. This stud projects inwardly from a plug 45 screw threaded into the casing in sealed relation and maintaining a fixed position with the casing after assembly. The collar 42 has arm 31 fixed thereto. This shaft portion 41 is also provided with a back seat 46 which engages the casing at 47 at the marginal portion of the casing which surrounds the bore 48 therethrough. A spring 49 acting between the closure 45 and through the arm 31, urges the inner shaft portion 41 into sealing engagement with the casing.

The outer shaft part designated generally 50 comprises a shaft part 51 which enters and has a rotary bearing in the bore 48 and is provided with a tongue 52 to enter a recess 53 in the shaft part 41 so that when turning one shaft part occurs the turning of the other shaft part will correspondingly move with it. The two shaft parts 41 and 51 are held together by a screw 54 extending through a bore 55 in the shaft part 51 and entering a threaded bore 56 in the shaft part 41. This screw 54 is accessible from the outer side of the casing where it is provided with a slotted head for manipulation. Seals are provided in the outer shaft part by means of O-rings 57 located in grooves 58 in the outer shaft part 51.

Figure 5:
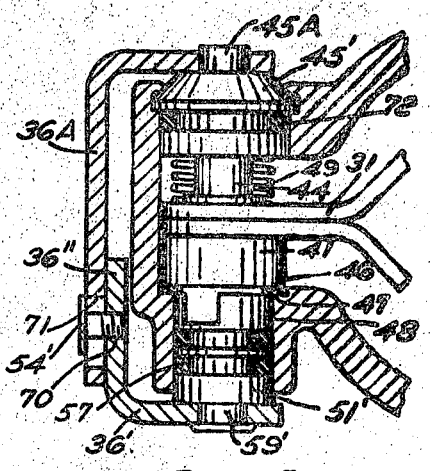
FIG. 5 is a partial sectional view similar to FIG. 2 of a modified form.

Referring to the embodiment of FIG. 5, an alternate form of the shaft has been illustrated. Here the inner part 41 is substantially identical to its counterpart in the above-described arrangement, and it is rotatably mounted within the casing on a stud 44 that projects inwardly from a plug 45' that is press fitted into the casing, sealed therein by an O-ring 72 and then staked into position by upsetting a portion of the casing. The plug 45' is however provided with a pivot pin 45A to receive a portion of the yoke 36A, the purpose for which will be presently described. The inner shaft portion 41, as in the other embodiment, is provided with a back seat 46 which engages the casing as at 47 and the spring 49 that acts between the underside of the plug 45' and the inner shaft 41 urges the inner shaft portion into sealing engagement with the casing.

Figures 2, 4:
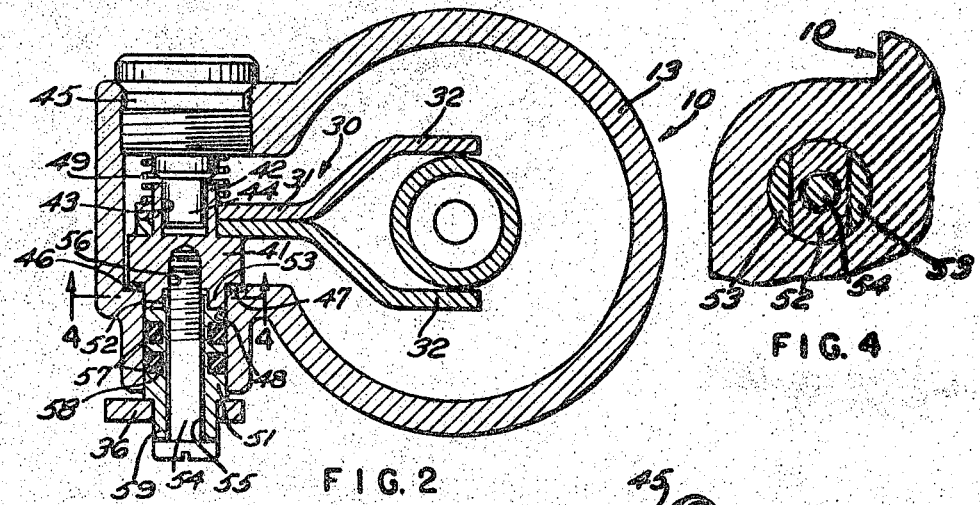
FIG. 2 is a sectional view taken on lines 2-2 of FIG. 1.
FIG. 4 is a section on lines 4-4 of FIG. 2.
Figure 3:
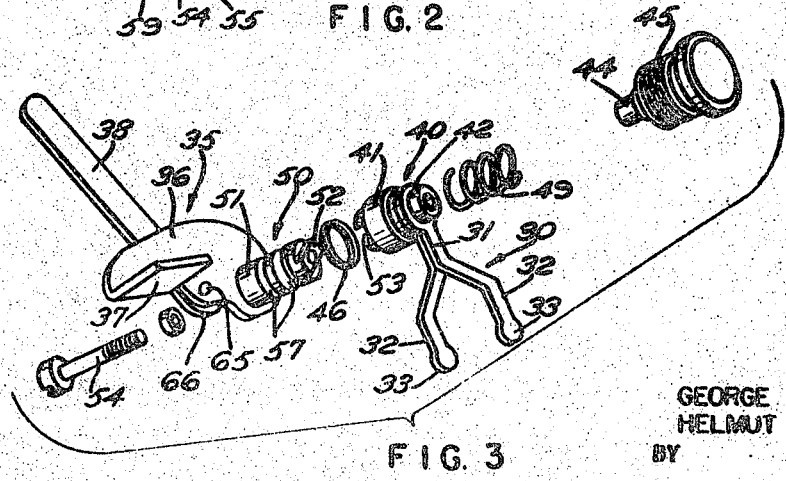
FIG. 3 is an exploded view of a portion of the operating shaft with parts shown in detached arrangement.

The outer shaft part 51' has rotary bearing as before in a bore 48 and is keyed to the shaft part 41 by a tongue and groove arrangement so that like motion will be had. The outer shaft part 51' has a reduced portion 59' with a flat thereon and secured to this portion, as by staking over the terminal end of the part 59', is a portion of the actuating lever 36'. The actuating lever 36' has an extension arm portion bent substantially at right angles thereto which extension arm portion designated 36" has a threaded bore 70 to receive a screw 54' and passes through an aperture 71 in the yoke 36A. Tightening of the screw 54' will make integral the parts 36' and 36A and it will be noted that these two sections will effectively hold the outer shaft part 51' in position since a yoke is formed between the pivot boss 45A and the reduced portion 59'. This embodiment locates the fastening screw for the inner and outer shaft parts at right angles to that as illustrated in FIGS. 1, 2 and 3, which in many applications is necessary as access cannot always be had to a screw slot at right angles to the piping in which the valve is connected.

The actuating lever 36 or 36' is fixedly connected to the reduced portion 59 of the outer shaft part so that motion of this arm 36 will rotate or move the shaft. As the shaft rotates or moves, wear will of course first occur at the seals 57 which seals move with the shaft in the bore 48 of the casing and in order to replace these worn seals, the arrangement of the parts is such that this may be done in a simple manner. It is merely necessary to remove the screw 54 or 54' and to pull the outer shaft part 51 or 51' with its lever or arm 36 or 36' outwardly, the spring 49 urging the inner shaft part 41 into sealing position between the back seat packing 46 and surface 47. The seals 57 may then be replaced and the shaft part 51 again inserted and the screw 54 or 54' replaced. Thus, the seals most likely to wear may be easily replaced without dismantling the entire valve.

The arm 36 and its flange 37 are in the path of the piston from a heat motor 39 which will rock the actuating lever 36 as the piston protrudes to the left as shown in FIG. 1, thus rocking the arm 31 and lifting the disc 20.

If it is desired to manually operate the actuator, the handle 38 may be swung about its pivot 65 so that its cam shaped end 68 may engage some portion of the casing, such as cover 14, and move the arm 36 counterclockwise as seen in FIG. 1 to open the disc 20.

I claim:

1. In a valve having a casing with a passage therethrough, a valve disc controlling said passage, said casing having an opening therethrough, mounted in said casing for reciprocating motion relative to said passage for an actuator arm for said disc located within said casing, said actuator arm coupled to said disc to move the disc with reference to said passage, a two part shaft extending thru said opening with an inner part operably connected to said actuator arm and an outer part outside of said casing for receiving actuating motion, means axially separable keying said shaft parts together whereby the two parts of the shaft rotate as one to operate said actuator arm upon said outer shaft part receiving actuating motion, a seal engaging said outer shaft part and the wall of said casing opening through which it extends to provide a seal about said shaft and means accessible from outside of said casing for releasably holding said shaft parts keyed together.

2. In a valve as in claim 1 wherein said seal is an O-ring.

3. In a valve as in claim 2 wherein there are a plurality of O-rings.

4. In a valve as in claim 1 wherein said seal is an O-ring and one of the surfaces which it seals has a recess to receive it.

5. In a valve as in claim 1 wherein the inner shaft part has sealing engagement with the inner surface of said casing.

6. In a valve as in claim 1 wherein the inner shaft part has sealing engagement with the inner surface of said casing by means of a seal surrounding and engageable with the margin of said casing about the inner end of said opening.

7. In a valve as in claim 1 wherein the inner shaft part has sealing engagement with the inner surface of said casing by means of a seal surrounding and engageable with the margin of said casing about the inner end of said opening and means urges the inner shaft part axially toward said margin when the outer shaft part is removed.